March 23, 1965  A. G. CONKLIN  3,174,357
CONTROL DEVICE FOR A MARINE OUTBOARD MOTOR
Filed Aug. 6, 1962

INVENTOR
ALEXANDER G. CONKLIN
BY *Smart & Biggar*
ATTORNEYS.

United States Patent Office
3,174,357
Patented Mar. 23, 1965

3,174,357
CONTROL DEVICE FOR A MARINE
OUTBOARD MOTOR
Alexander G. Conklin, 494 Dufferin Road,
Toronto 3, Ontario, Canada
Filed Aug. 6, 1962, Ser. No. 215,168
1 Claim. (Cl. 74—480)

This invention relates to a control device for a marine outboard motor and particularly to a steering and throttle controlling device for such motors when provided with a rotary speed control or twist grip on the tiller.

With present short tillered outboard motors, there is a necessity for the operator to sit in the stern of the boat and when he is alone, not only is the boat unstable because of the uneven weight distribution but also the raising of the bow of the boat obscures the operator's vision.

Obvious attempts have been made to overcome these disadvantages by use of extension handles, however, it will be clear that a mere elongation of the tiller handle has the disadvantage that substantial lateral movement of the outer end of the extension handle is necessary for the attainment of even a relatively small angular movement of the tiller handle. Extension handles are known which overcome this problem to a certain extent by the provision of a cylindrical flexible connection between a rigid extension handle and the tiller handle. Such an extension handle allows for the lateral steering movement of the tiller handle upon movement of the free end of the extension handle in a direction substantially parallel to the longitudinal centre line of the boat, the aforesaid cylindrical flexible connection being bent to an angle of approximately 90° when the tiller handle is displaced laterally to the limit of its arc.

This prior proposed structure is subject to many disadvantages. The rigid extension handle being connected to the tiller handle by a flexible tube swings, when released after said flexible tube has been in a bent position, out of reach of the operator and creates a hazard. The flexible tube, due to the twisting and bending action imparted thereto is subject to breakage and especially so in salt water areas. Further, the cylindrical flexible member because of its necessity to easily bend through 90° has to be highly flexible and cannot therefore positively transmit torsional forces and indeed, when bent to any great degree it is doubtful whether it would be able to convey any torsional force whatsoever.

Yet a further disadvantage of the prior proposals was and still is that they lacked versatility, in that the inside diameter of the cylindrical flexible member being fixed the extension could not be adapted to fit all types of tiller handles.

The above disadvantages may be overcome or reduced according to the present invention by providing a control device having an adjustable attachment head and a rigid control arm, the two being connected by a universal joint.

In the present invention the universal joint connecting the attachment head and control arm permits of full navigational control by the operator in that it transmits positively to the tiller handle (and the twist grip throttle control if thereon) both push-pull and rotational forces respectively to guide and control the speed of the boat.

According to a feature of the invention, the attachment head is adapted to fit various diameters of tiller handles and is preferably composed of flexible fingers reinforced on their outside surfaces by narrow rigid members and secured tightly to the tiller handle, when in place thereon, by means of a circumferential clamping device.

In the accompanying drawings which illustrates an embodiment of the invention:

Figure 1:
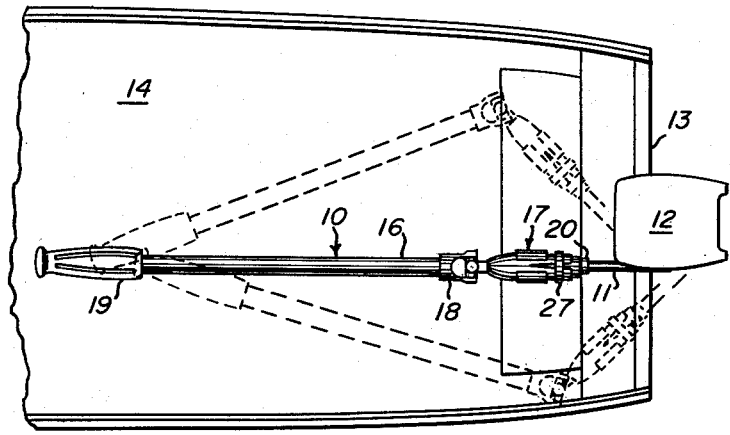
FIGURE 1 is a partial plan view of a boat showing an outboard motor secured to the stern thereof.
Figure 2:
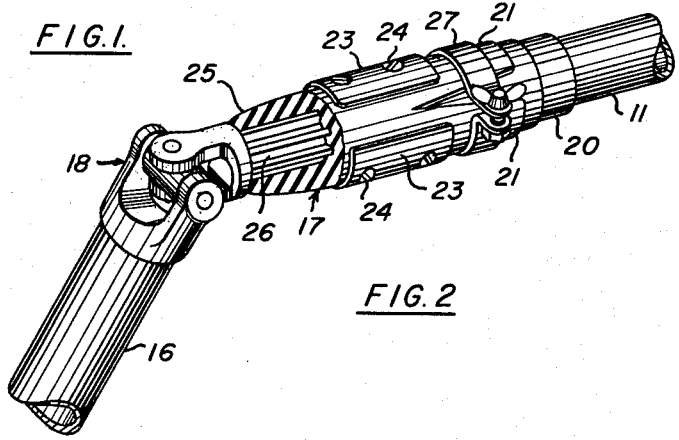
FIGURE 2 is an enlarged perspective detail of the attachment head and universal joint.

Turning now to the drawings, the control device generally designated as 10 is attached to the tiller 11 of an outboard motor 12 which is secured in operative position to the stern 13 of a boat 14.

The control device comprises a control arm 16 connected to an attachment head 17 by means of a universal joint 18.

As will be seen from the drawings a lateral displacement of tiller 11 in either steering direction is accomplished by a push or pull force on the outer end of control arm 16 which may be conveniently equipped with a hand grip 19. The outer end of the control arm will, during operation, travel in a line substantially parallel to the longitudinal axis of the boat 14. When the boat is travelling in a straight line and all components of the control device and the tiller lie in a direction parallel to the length of the boat, as seen in full line in FIG. 1, a lateral displacement of the tiller handle 11 to alter course may be accomplished by the operator by manual application of the push or pull force in the required direction on the control arm 16 at a point adjacent to the universal joint 18. This force is transmitted to the tiller 11 through the universal joint 18 and the attachment head 17. In practice the operator will probably hold the hand grip 19 in the hand other than the hand which applies the push force or he may conveniently, when sitting in the middle of the boat and facing forward, hold the control arm 16 under an arm pit and by twisting his body apply the steering force. The tiller is returned to a central position by applying the opposite push or pull force.

It is to be noted that if the control arm 16 should be released or dropped by accident or design the control handle simply falls into the boat.

An important feature of the invention is that in all positions of the tiller handle 11 having a twist grip throttle control 20, a torsional force may be applied to the control arm 16 and will be transmitted positively to the attachment head 17 and thus to the throttle control 20 through the universal joint 18.

The attachment head 17 is comprised of a base 25 of say rubber which is secured e.g. by bonding to the shaft 26 of the universal joint, the base having two or more flexible fingers 21 emanating therefrom which fingers form a tiller receiving sleeve which allows the attachment head to be secured to a tiller arm 11 regardless of the diameter of that tiller arm. For purposes of reinforcement narrow rigid members 23 are secured to the flexible fingers 21 by means of screws 24 or otherwise. A suitable clamping device such as the ring and the wing nut indicated at 27 is provided for tightening the receiving sleeve about the tiller handle so that the control device is securely retained in force transmitting relation on the tiller. This arrangement provides that the device of the present invention may be used without alteration, with a wide variety of makes of outboard motors.

What I claim as my invention is:

In combination with an outboard motor having a tiller and a twist grip throttle control therein, a throttle and steering control device comprising an attachment head adapted for attachment to the twist grip, an elongated control arm and a universal joint connected on the one hand to the attachment head and on the other hand to the control arm, said control arm being freely pivotable about said attachment head such that a pushpull movement of said control arm generally towards and away from said motor is transmitted to the tiller to effect steering, and said control arm being rotatable only with said attachment head such that a torsional movement of said control arm is transmitted to the twist grip tiller handle to effect motor control whereby control of said motor and tiller may be effected from a point remote therefrom.

References Cited by the Examiner
UNITED STATES PATENTS

| | | | |
|---|---|---|---|
| 309,438 | 12/84 | Carleton | 287—53 X |
| 434,050 | 8/90 | Remington. | |
| 1,089,136 | 3/14 | Kainer. | |
| 1,487,604 | 3/24 | Rideout | 74—479 |
| 1,843,272 | 2/32 | Erinrude. | |
| 1,859,038 | 5/32 | Irgens. | |
| 2,036,948 | 4/36 | McNary | 74—504 |
| 2,679,766 | 6/54 | Jocobsen et al. | |
| 2,903,903 | 9/59 | Jaromy. | |
| 2,926,544 | 3/60 | Carmichael. | |

BROUGHTON G. DURHAM, *Primary Examiner.*